UNITED STATES PATENT OFFICE.

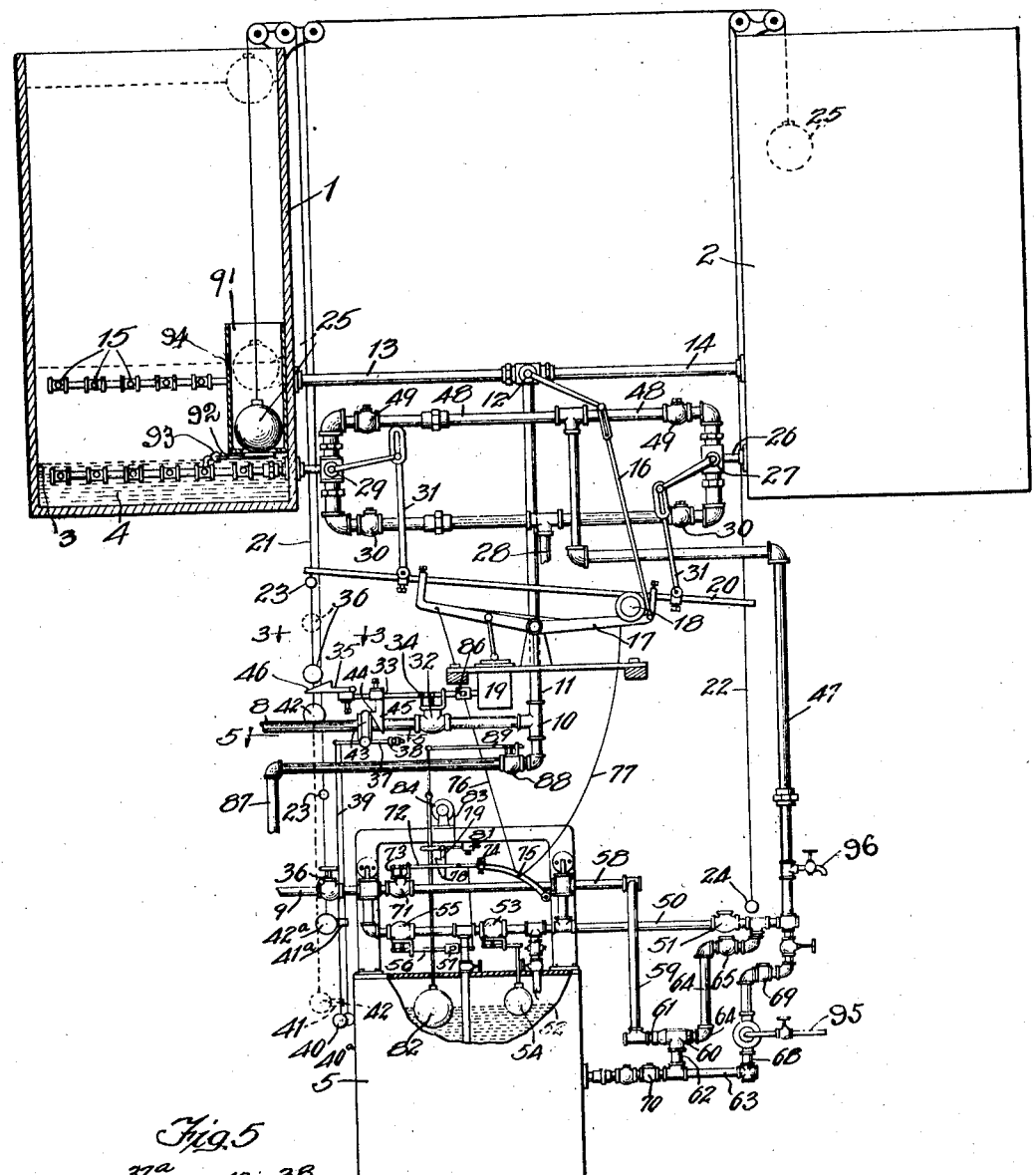

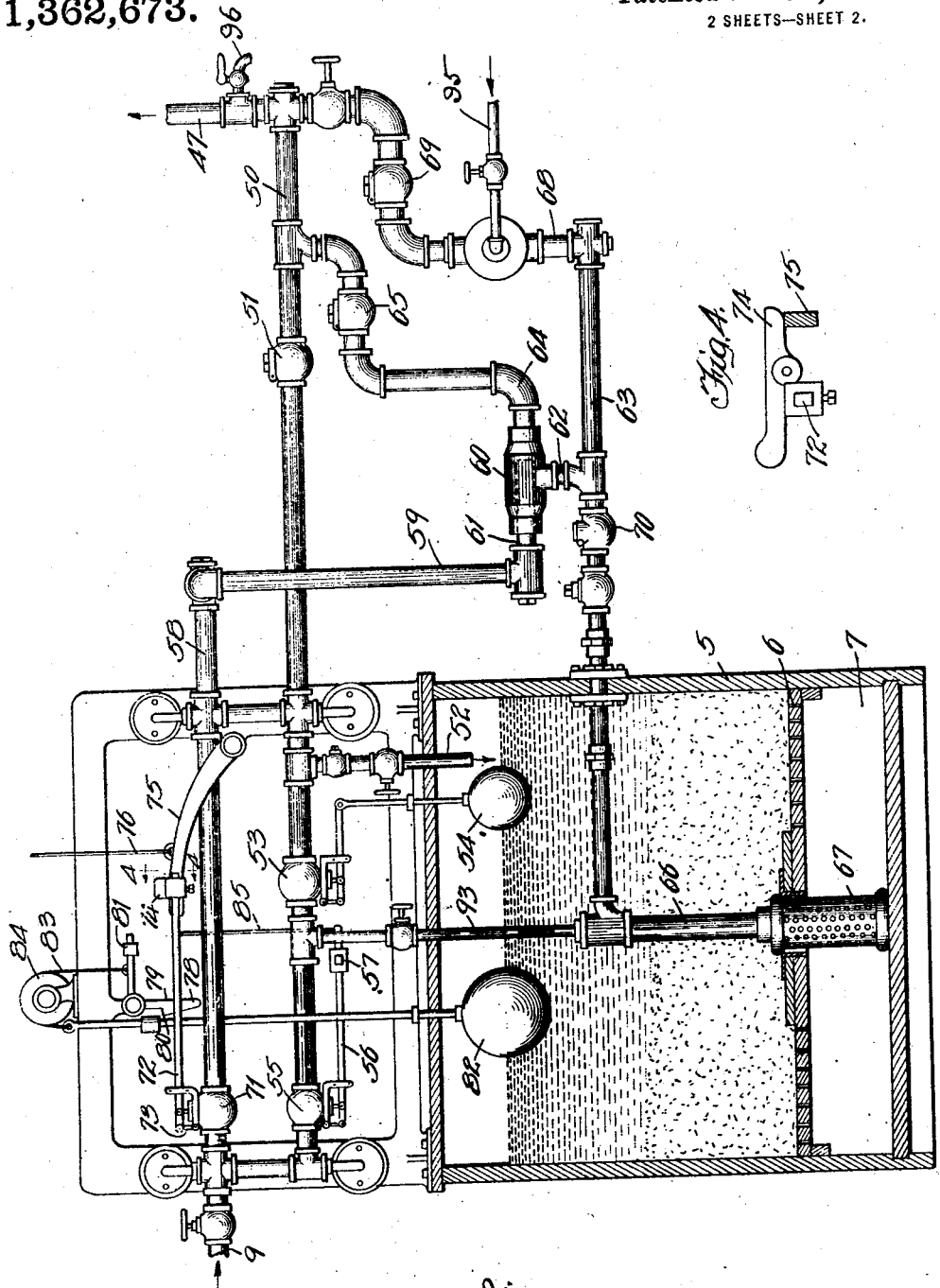

JOHN E. CAPS, OF WILMETTE, ILLINOIS.

WATER-SOFTENING APPARATUS.

1,362,673.   Specification of Letters Patent.   Patented Dec. 21, 1920.

Application filed March 29, 1917. Serial No. 158,416.

*To all whom it may concern:*

Be it known that I, JOHN E. CAPS, citizen of the United States, residing at Wilmette, in the county of Cook and State of Illinois, have invented certain new and useful Improvements in Water-Softening Apparatus; and I do hereby declare the following to be a full, clear, and exact description of the invention, such as will enable others skilled in the art to which it appertains to make and use the same.

This invention relates to improvements in water-softening apparatus of the type in which filter beds of zeolites are employed as the softening reagent.

The invention relates more particularly to apparatus of this character adapted to provide a continuous supply of soft water, and has for its main object to provide a simple and efficient means for automatically regenerating the filter beds of zeolites at intervals to restore or maintain their efficiency to soften water without, however, interrupting the continuous supply of soft water to the service pipes or point of consumption of the latter.

A further object of the invention is to so effect regeneration and restoration of each filter bed of zeolites as to carry off from the same, simultaneously with regeneration thereof, all deposits of solids or scum accumulating upon such filter bed to the end that free filtration may be promoted and clear soft water delivered.

Other objects of the invention will appear from the following specification, reference being had to the accompanying drawings illustrating a suitable embodiment thereof, in which:

Figure —1— is a view partly in section and partly in elevation showing a water-softening apparatus constructed in accordance with the invention.

Fig. —2— is a detail section, partly in elevation on an enlarged scale, showing the brine tank and the connections for automatically effecting and controlling regeneration of the zeolite reagent by means of brine supplied from the said tank.

Fig. —3— is a fragmentary detail section on the line 3—3 of Fig. —1— showing two trip-levers associated with one of the valves for actuation of the latter at different intervals by the floats in the two tanks.

Fig. —4— is a fragmentary detail section on the line 4—4 of Fig. —2—.

Fig. —5— is a fragmentary detail section on the line 5—5 of Fig. —1—.

In said drawings 1 and 2 are tanks which may be of any desired size for containing water to be softened. In the bottom of each of said tanks preferably, there is mounted a suitable support 3 for a filter bed containing the zeolite provided with openings for the passage of filtered water into the space 4 below said support, it being obvious, of course, that a separate filter bed container may be employed and that the details of construction and arrangement shown may be varied at will to best adapt the device to the available space and other conditions presented at the place of installation of the apparatus.

Associated with the tanks 1 and 2 is a tank 5 equipped with a suitable foraminous plate 6 above the bottom thereof which is adapted to support a bed of common salt or such other soluble chemicals as may be necessary and requisite to regenerate the particular zeolite employed, said tank being adapted to receive water which, in filtering through the bed of salt or the like, will become saturated with the latter and will fill the space 7 underneath the plate 6, a given level of water being maintained above the bed of salt for reasons hereinafter particularly pointed out.

Water is supplied to the apparatus from a city water main or other source of supply under pressure at two points through pipes 8 and 9. The pipe 8 connects with the T-coupling 10 between the ends of a pipe 11 which connects at one end with the casing of the three-way valve 12 communicating with the tanks 1 and 2 by means of pipes 13 and 14 respectively. Each of the latter terminates within the tank supplied thereby and is equipped with perforated branches 15 from which the water flows and is more or less equally distributed over the area of the tank so as not to disturb the level of the top of the filter bed in the tank which would interfere more or less with uniform filtration and might result in so-called "channeling" of the filter bed.

The stem of the three-way valve 12 is connected by means of the link 16 with the cradle 17 suitably pivotally supported between its ends and carrying a weight 18 which travels by gravity from one end of said cradle to the other as the latter is rocked on its pivot, the rocking motion thereof being cushioned by means of the dash-pot 19 in a well known manner. The cradle carries a rod 20, projecting beyond the ends thereof, the respective ends of the same being longitudinally slotted for the passage of chains or cables 21 and 22 respectively, carrying projections 23 and 24 for actuating the rod 20 to rock the cradle 17. Each of the chains or cords 21 and 22 is connected with a float, only one of same being shown at 25 in the tank 1 near the lower limit of its movement and water contained in said tank is free to flow through the filter bed therein and into the pipe 26 to the casing of the three-way valve 27. The latter is now positioned to cause this water to pass to the soft-water service pipe 28. The tank 1 is similarly connected with the casing of a three-way valve 29 and the service pipe 28, there being check valves 30 interposed between the said valve-casings 27 and 29 and the service pipe 28 to prevent water from the tank 2 flowing into the tank 1 and vice versa.

The stems of both valves 27 and 29 are connected with respectively opposite end portions of the rod 20 by means of links 31 so that said valves will move simultaneously to establish communication between one of the tanks and the service pipe, and at the same time cut off the connection of the other tank therewith. At the same time the valve 12 will be turned so as to cause the supply of water to enter one of the tanks and shut it off from the other thereof. The water-supply to the valve-casing 12 is further controlled by a valve 32 interposed in the pipe 8, the stem of said valve being connected with a lever 33 pivotally supported between its ends on a standard 34 on the valve-casing. The said lever 33 is provided at one end with a trip lever 35 which is free to turn upwardly in a clock-wise direction without moving the lever 33 from its normal position, but which is moved in the opposite direction to open the valve 32 by means of a collar 36 carried by the chain or cable 21. The said valve 32 is held in its open position by means of two levers 37 and 37ª rigid with respect to each other pivotally mounted between their ends on a collar carried by the pipe 8, and one of which is provided at one end with a counter-weight 38, the other ends thereof carrying chains or cables 39 and 39ª provided at their lower ends with collars 40 and 40ª which are adapted to be engaged by projections 41 and 41ª on weights 42 and 42ª mounted upon the lowermost ends of the chains or cables 21 and 21ª respectively, for turning said lever 37 against the action of the counterweight 38 as either of the collars 40 or 40ª is engaged by the projection of one of the weights 42 or 42ª. The lever 37 carries a latch member 43 which is adapted to engage the shoulder 44 of a wedge-shaped projection 45 mounted on the lever 33 between the ends of the latter. The counterweight 38 serves to maintain the latch member 43 normally engaged with the shoulder 44, and as the lever 33 is forced to position to open the valve 32 by the action of the collar 36, the inclined face of the projection 45 below the shoulder 44 will move the latch member 43 over so that as soon as the shoulder 44 passes the interengaging portion of the latch member 43 the latter will automatically move into engagement with said shoulder and thus prevent the lever 33 swinging in a direction to close said valve. The collar 36 is adapted to pass the trip lever 35 by moving downwardly on the inclined upper face 46 thereof, after having moved said lever to the lower limit of its movement or in position to open the said valve 32.

The valve-casings 27 and 29 are further connected with a water-supply pipe 47 by means of branch pipes 48 in each of which a check-valve 49 is interposed to prevent the flow of water from the tanks 1 and 2 into the pipe 47, and to permit free flow from the pipes 48 into said tanks, respectively. The pipe 47 is connected by means of a branch pipe 50, having a check-valve 51 interposed therein with the service pipe 9. A branch 52 of said pipe 50 projects into the brine tank 5 for supplying water to the latter; said supply being controlled by a valve 53 controlled by the float 54, and also by a valve 55, the stem of which is connected with a lever 56 carrying a weight 57 acting to normally maintain said valve 55 open. Connected with the service pipe 9 is a by-pass pipe 58 which connects, by means of pipe 59, with a T-coupling 60 by means of the smaller branch 61 projecting, as shown in Fig. —2—, more than half way through said coupling, and past the pipe 62 connecting said T-coupling with a pipe 63 leading from the brine tank 5. From the other end of the T-coupling 60, a pipe 64 having a check-valve 65 interposed therein connects with the branch 50 between the check-valve 51 and the connection of said branch 50 with the pipe 47. The pipe 63 connects at one end with the stand pipe 66, in the brine tank 5, which extends into and to a point contiguous to the bottom of the chamber 7 of the latter within the foraminous casing 67, and at its other end connects with a pipe 68, having a check-valve 69 interposed therein, to the lower end of pipe 47. The check-valve 69 is adapted to prevent flow from the pipe 47 into the pipe 63, but permits flow in the opposite direction. A check-valve 70 is also interposed in the pipe 63, at a point between the connection of the latter with the pipe 62 and T-coupling 60, and its connection with the pipe 66, which further prevents flow from the pipe 62 through the pipe 63 into the pipe 66.

There is interposed in the pipe 9 a valve 71, the stem of which is connected with a lever 72 pivotally engaged at one end with a standard 73 on the valve-casing 71, and which, at its other end, is provided with a trip lever 74 which normally bears upon the upper face of a trip lever 75 connected, by means of a chain or cable 76 and 77, with the opposite ends of the cradle 17. The valve 71 is normally closed and is adapted to be opened by an upward swing of the lever 75 which is adapted to swing through an arc so as to pass the trip-lever 74, whereupon the said lever 72 is free to drop back to its normal position. In its upward travel, however, it engages the beveled surface 78 of a trip-lever 79 and becomes supported upon the shoulder 80 of the latter. The lever 79 is a bell-crank lever, the horizontal arm of which carries a weight 81 for normally maintaining the beveled surface 78 in engagement with the said lever 72. Consequently, said lever 72 will remain supported in position to maintain the valve 71 open until the shoulder 80 is moved out of supporting relation thereto; this being accomplished by the float 82 in the brine tank 5, the stem of which is connected with a chain or cable 83 trained over an idler 84, and connected at its other end with the said horizontal arm of the bell-crank lever 79. When the valve 71 is open water will pass through the pipe 9 into the T-coupling 60 and by its injector-like action will cause a suction from the pipes 63 and 66, thus drawing brine from the space 7 of the tank 5, and delivering it into the pipe 47. From the latter such brine will pass through one of the valve-casings 27 or 29, depending upon which of the tanks 1 or 2 is empty at this particular moment. As soon, however, as the level of the water at the tip of the tank 5 has dropped a given distance the lever 79 will be tripped; thus releasing the lever 72 and automatically effecting closure of the valve 71.

At the same time that the float 82 drops, the float 54 will likewise drop, thus opening the valve 53. The lever 72 is connected by means of the chain or cable 85 with the lever 56 controlling the valve 55, and as the lever 72 resumes the position shown in Figs. —1— and —2—, the said lever 56 will be in the position shown in said figures, thus opening the valve 55 so that the moment the valve 53 is opened water will run from the pipe 9 through the branch 50 into the pipe 47, a portion of the water running into the brine tank 5 and refilling the latter to its normal level. As soon as this has been accomplished the valve 53 will be automatically closed by the rise of the float 54 thus interrupting the supply through the pipe 50.

As previously stated, the valve 32 is normally closed, being held in its closed position by the counter-weight 86 on the lever 33, and is moved to open position by the collar 36 on the chain or cable 21, and is latched in its closed position by the latch member 43 on the lever 37. When the float 25 in the tank 1 has attained the position shown in dotted lines contiguous to the top of said tank 1, the said lever 37 will be moved by means of the engagement of the projection 41 with the collar 40 to release the latch member 45, whereupon the valve 32 will be closed; thus shutting off the flow of water through the pipe 11 and valve casing 12, and pipe 13, into said tank 1. The tank 1 will be filled to the level necessary to raise the float 25 to the position shown in full lines in Fig. —1— during the period that the brine tank 5 is refilling to the normal level, though during this period and the preceding period during which the brine is being carried through the pipe 47 into the tank 1 the pipe 87 leading to the sewer will be open. The said pipe connects with the T-coupling 10 and is provided with a valve 88. The stem of the latter is connected with the lever 89 pivotally supported between its ends on the casing of the valve 88, and is connected by means of a link 90 with the stem of the float 82 so that said valve 88 will open at the same time that the valve 71 is opened, and will gradually close as the float 82 rises. While said valve 88 is open, the brine and flush water fed to the tank 1 will be drained off but not quite as rapidly as it enters the said tank so that its level will rise gradually therein.

During the interval that the valves 53 and 55 are open the valve 71 is closed and the collar 36 is positioned as shown in dotted lines in Fig. —1—. As the float 25 approaches the lower limit of its movement it enters a small tank or receptacle 91 in the bottom of the tank 1. The said receptacle 91 is drained by means of a pipe 92 leading from the bottom thereof and having a check valve 93 interposed therein which prevents flow into said receptacle. The latter is also provided with an opening 94 through which water is adapted to enter to relatively rapidly fill the same to the level of said opening. This causes the float 25 to rise relatively rapidly to this point, shown in full lines in Fig. —1—, thereby causing the collar 36 to drop its full line position to open the valve 32 which then remains open until the level of water in the tank 1 attains the predetermined high point, whereupon the projection on the weight 42 will engage the collar 40 on the chain or cable 39 and release the latch members 43 and 45 to close the valve 32.

While the operation will probably be fully understood from the foregoing description, a brief review of the same may assist to a full comprehension.

Assuming that tank 1 has just been substantially drained and the cradle 17 just thrown over to the position shown in Fig. —1—. The float 25 will be in the lowest position and the levers 75 and 72 in the position shown in dotted lines so that water from pipe 9 will be flowing through the injector-T 60 and drawing brine from the bottom of tank 5 and delivering it, diluted with the water from pipe 9, into pipe 47 and thence into the bottom of tank 1. The floats 54 and 82 are now lowering and valve 88 opening so that by the time the brine has attained the level of pipe 13 the valve 88 will be substantially fully opened. The brine preferably rises rather slowly through the filter bed so as not to agitate the same and, in rising, floats off the scum from the top of the filter bed. As soon as float 82 has dropped a certain distance it will trip the lever 72 and cause the valve 71 to close and the valve 55 to open so that water from the pipe 9 now flows through pipe 50 and delivers water to the tank 5 through pipe 52 to gradually refill the same. The withdrawal of brine ceases and the water passes into tank 1 to flush the latter and wash out the brine. During this time the floats 54 and 82 rise slowly and gradually close the valves 88 and 53, the former closing in advance of the latter so that water will continue to flow into the tank 1 after the drain pipe is shut off. The water continues to rise in the tank 1 until it attains the level of the opening in the small receptacle containing the float 25. This tank fills rapidly and causes the float to rise to the level of said opening rapidly, thus causing the collar 36 to engage the lever 33 and open the valve 32 thus admitting water from pipe 8 which now rapidly fills the tank 1 and causes the float 25 to rise to the upper dotted position and as it rises a little higher than said position, the projection 41 on the weight 42 will engage the collar 40 on the chain 39 thus tripping the latch 43, 45 and causing the valve 32 to close.

During this interval the tank 2 is emptying and as soon as the collar 24 of the chain 22 has engaged the rod 20 to throw the cradle 17, the same sequence of operations takes place to regenerate, flush and refill tank 2, while tank 1 is connected with the service pipe 28 which may, of course, constitute the supply to a pressure pump should the conditions of the installation require greater than gravity pressure at the point or points of consumption of the soft water.

In order to be prepared for unexpected contingencies the pipe 68 is connected by means of a valve-controlled pipe 95 with a source of supply of steam under pressure which constitutes an injector pump to deliver strong brine into the tank, the filter bed of which is to be regenerated. This might require to be accomplished quickly in the event that one tank should be drained before the other is refilled to a sufficiently high level to insure a continuous supply of soft water. Other contingencies might also arise which would render the steam connection very essential.

A test cock 96 is provided in the pipe 47 to permit brine samples to be taken for hydrometer test to ascertain its density. A dilute brine is preferable to a saturated solution as it regenerates the filter-bed with sufficient rapidity and effects a very uniform distribution of the brine or other regenerating fluid throughout the filter bed and is very easily flushed out.

In the event that the foraminous housing 67 should become clogged with salt, water is injected from the pipes 63 and 66 to dissolve and wash out the same.

I claim as my invention:

1. A water-softening apparatus including two containers for predetermined quantities of water to be softened, a filter bed containing zeolite associated with each container, a source of supply of water common to both containers, connection between the respective containers and service piping, valves controlling said connections arranged to maintain the supply to one container open to refill the same while the other container is connected with the service piping, floats in said containers, and operative connection between the same and said valves for shutting off the connection of one container with the service piping as the other is connected therewith, and operative connection between each float and the water supply valve for shutting off the latter as each tank is refilled without disturbing the connection of the other tank with the service piping.

2. A water-softening apparatus including two containers for predetermined quantities of water to be softened, a filter bed containing zeolite associated with each container, a source of supply of water to each container, connection between the respective containers and service piping, valves controlling said connections arranged to maintain the supply to one container open to refill the same while the other container is connected with the service piping, floats in said containers, and operative connection between the same and said valves for causing said containers to drain alternately.

3. A water softening apparatus including a container for water to be softened, a filter bed containing a water-softening agent requiring to be regenerated at intervals, associated with said container, service piping for distributing water after passage through said filter bed, a source of supply of a filter-bed regenerating liquid, a source of supply of fresh water, a drain, valves controlling the connections of said container with said several parts, mechanism controlled by variations in water level in said container operatively associated with the several valves for synchronously operating the same to regenerate and flush the filter-bed and refill the container consecutively.

4. A water softening apparatus including a container for water to be softened, a filter bed containing a water-softening agent requiring to be regenerated at intervals, associated with said container, service piping for distributing water after passage through said filter bed, a source of supply of a filter-bed regenerating liquid, a source of supply of fresh water, a drain, valves controlling the connections of said container with said several parts, and a float in the container common to and operatively associated with said several valves for synchronously operating the same to regenerate and flush the filter-bed and refill the container consecutively.

5. A water softening apparatus including a container for water to be softened, a filter bed containing a water-softening agent requiring to be regenerated at intervals, associated with said container, service piping for distributing water after passage through said filter bed, a source of supply of a filter-bed regenerating liquid, a source of supply of fresh water, valve-controlled connection for admitting said regenerative liquid and fresh water to the container to flow through the filter bed reversely of the flow therethrough of water to be softened, a drain for taking off the regenerative liquid and a flushing charge of fresh water above the level of the filter bed, a valve-controlling the drain, and mechanism controlled and actuated by variations in water level within the container and operatively associated with said several valves to synchronously operate the same to effect regeneration and flushing of the filter-bed and drain off the regenerative and flushing liquids consecutively.

6. A water-softening apparatus including a container for water to be softened, a filter bed containing a water-softening agent requiring to be regenerated at intervals, associated with said container, service piping for distributing water after passage through said filter bed, a source of supply of a filter-bed regenerating liquid, a source of supply of fresh water, valve-controlled connection for admitting said regenerative liquid and fresh water to the container to flow through the filter bed reversely of the flow therethrough of water to be softened, a drain for taking off the regenerative liquid and a flushing charge of fresh water above the level of the filter bed, a valve-controlling the drain, a second valve controlling the supply of fresh water to the container, and mechanism controlled and actuated by variations in water level within the container and operatively associated with said several valves to synchronously operate the same to effect regeneration and flushing of the filter-bed and drain off the regenerative and flushing liquids consecutively, and thereupon closing the drain and opening the second supply-valve for refilling the container and thereafter closing said second supply valve.

7. Water sofetning apparatus including two tanks adapted to contain water to be softened, connection between said tanks and service piping common to both thereof, a zeolite containing filter bed for each tank through which water contained therein passes before entering the service piping, a receptacle containing a filter-bed regenerating liquid, a water supply pipe for said receptacle and said tanks, means for admixing regenerative liquid from said receptacle with water admitted to said tanks through said supply pipe, valves controlling the several connections and said means, mechanism associated with said valves for synchronously operating the same for closing the connection of one tank with the service piping and at the same time connecting the other therewith, and means controlled by variations in water levels in said tanks for actuating and controlling said mechanism.

8. Water softening apparatus including two zeolite containing filter beds, a source of supply of water under pressure, means for alternately passing predetermined volumes of water through the respective filter beds, a container for a zeolite regenerating solution, a supply pipe for water under pressure leading to said container and said filter beds, a pipe leading from said container and connecting with said supply pipe to cause liquid to be drawn from said container and delivered to a filter bed, a by-pass pipe for delivering fresh water only direct to the filter beds, valves controlled by the water-supply in said container for controlling the flow of fresh water and regenerating liquid to said filter beds, means controlled by the passage of a predetermined volume of water through a filter bed connected with one of said valves for controlling the said fresh water supply independently of the means controlled by the water level in said container, a drain pipe for draining liquid from said filter beds, a valve controlling the said drain and connection between the same and said means controlled by the level of water in said container for effecting opening and closure of said drain.

9. Water softening apparatus including a pair of zeolite containing filter beds, means for passing predetermined volumes of water to be softened alternately through said respective beds, and means for automatically regenerating and flushing each bed after passage of a predetermined volume of water therethrough including a tank containing a soluble zeolite regenerating agent and water to dissolve the same, a water supply pipe for the filter beds, an automatic valve for connecting the same alternately with said respective beds, an injector connection between said supply pipe and said tank for admixing regenerating liquid with the water entering said filter-beds, a float controlled valve controlling said connection, a by-pass around said connection, a float-controlled valve controlling the same and adapted to be opened as the water level in said tank drops, operative connection between the last-named valve and the said automatic valve for effecting closure of the latter as the former opens, a branch pipe for delivering water from said supply pipe to said tank, a second float controlled valve for closing said supply pipe when the normal level of water in the tank is reëstablished, a drain pipe for the filter beds, and a float-controlled valve controlling the same for effecting closure thereof as said water supply pipe is closed.

10. A water softening apparatus comprising two tanks, a supply main and service piping common to both thereof for alternately filling and draining the same, floats in said tanks operatively controlling the supply and service connections for connecting one tank with the service piping as the other tank is cut off therefrom, a zeolite filter bed for each tank, a branch supply pipe common to both tanks and adapted to be connected with the service piping, a source of zeolite regenerating liquid, connection between the same and the branch supply pipe for effecting admixture of said liquid with the water entering the tank from said branch supply pipe for regenerating the filter bed thereof, means for automatically discontinuing the supply of said liquid and continuing the supply of water from said branch pipe to flush the filter bed after regeneration, means for automatically draining off the regenerating liquid and flushing water from the tank, means controlled by the float in said tank for opening the main supply pipe, and means for automatically interrupting the drain from the branch supply to the tank substantially simultaneously with the opening of the main supply to the tank.

11. A water-softening apparatus including two containers for predetermined quantities of water to be softened, a filter bed containing zeolite associated with each container, a source of supply of water common to both containers, connection between the respective containers and service piping, valves controlling said connections arranged to maintain the supply to one container open to refill the same while the other container is connected with the service piping, floats in said containers, and operative connection between the same and said valves for shutting off the connection of one container with the service piping as the other is connected therewith, and a valve for shutting off the supply of water to the idle tank as the latter is refilled without disturbing the connection of the other tank with the service piping.

12. A water-softening apparatus including two zeolite filter-beds, a single source of supply of water to be softened common to both thereof, service piping common to both thereof, means for alternately automatically cutting off communication between each filter bed and said source of supply after a predetermined volume of water has passed through said filter bed, and simultaneously therewith cutting off communication between the same and the service piping and opening communication between the same and a drain, maintaining said conditions during a predetermined interval for permitting regeneration of the filter-bed, and thereafter automatically restoring communication between said filter bed and said source of supply of water to be softened, and closing said drain.

In testimony whereof I have signed my name in presence of two subscribing witnesses.

JOHN E. CAPS.

Witnesses:
M. M. BOYLE,
J. C. BRACKETT.